Feb. 8, 1966  J. J. DRAGONE  3,233,900
PIN CONVEYING MECHANISM
Filed Nov. 26, 1962  3 Sheets-Sheet 1

INVENTOR.
John J. Dragone
BY Hofgren, Brady,
Wegner, Allen & Stellman
Attys.

INVENTOR.
John J. Dragone

United States Patent Office 3,233,900
Patented Feb. 8, 1966

3,233,900
PIN CONVEYING MECHANISM
John J. Dragone, Muskegon, Mich., assignor to Brunswick Corporation, a corporation of Delaware
Filed Nov. 26, 1962, Ser. No. 240,023
18 Claims. (Cl. 273—43)

This invention relates to bowling pin handling mechanisms. More particularly, this invention relates to mechanisms for conveying pins to pin distributing mechanisms and also relates to cooperative arrangements of pin conveying and distributing mechanisms.

It is a general object of this invention to provide a new and improved pin conveying mechanism for use in automatic pinsetter equipment.

Another object is to provide a new and improved pin conveying mechanism of the type described for receiving pins from a source such as a pin elevator and turnaround pan and delivering the pins to a pin distributing mechanism forming a part of, or intended for use in connection with, an automatic pinsetter, where the pin elevator and conveying mechanism function to maintain the bowling alley pit substantially free of pins to permit free passage of a bowling ball therethrough for return of the ball to a bowler while decreasing pin and ball jamming tendencies in the pit.

A further object is to provide a new and useful combination of pin conveying and pin distributing mechanisms of the type described which utilizes the two mechanisms in a cooperative arrangement wherein the conveying mechanism supplies pins as needed by the distributing mechanism.

Still another object is to provide a new and useful pin conveying mechanism which includes cross conveyor means for carrying pins from a pin source to a pin distributing mechanism or pin distributor and also provides for the diversion of pins from the cross conveyor means and includes by-pass means for returning pins directed from the cross conveyor to the pin source, the diverting of pins being responsive to pin supply conditions of a pin distributor.

A more specific object is to provide a new and useful pin conveying mechanism of the cross conveyor type which obtains pins from a pin elevator wheel and propels the pins on a conveyor belt within a conveyor trough or other conduit toward the pin distributor until its needs are satisfied whereupon a pin diverting means responsive to the needs of the pin distributor causes diversion of the pins from the trough through an opening on the side of the trough for return through a by-pass conduit to the pin elevator, and wherein the elevator wheel may be kept continuously rotating, minimizing or eliminating the necessity of stopping and restarting the wheel means for stopping and restarting need not be provided.

It is also an object of this invention to provide new and improved means for by-passing a pin distributing mechanism whenever pins are not needed by the mechanism and for returning pins to the pin source, thereby setting up a continuous cycling of pins to and from the pin source, the by-pass means being adapted to permit withdrawal of pins from the cycling stream or body of pins, the cycling pins constituting a ready body of stored pins which can be used to quickly supply a pin distributing mechanism upon demand.

Further objects and advantages will become readily apparent from the following detailed description taken in connection with the accompanying drawings, in which:

FIGURE 5 is a top plan of a portion of another embodiment of a pin cross conveyor, enlarged with respect to FIGURES 1 through 3.

Figure 1:
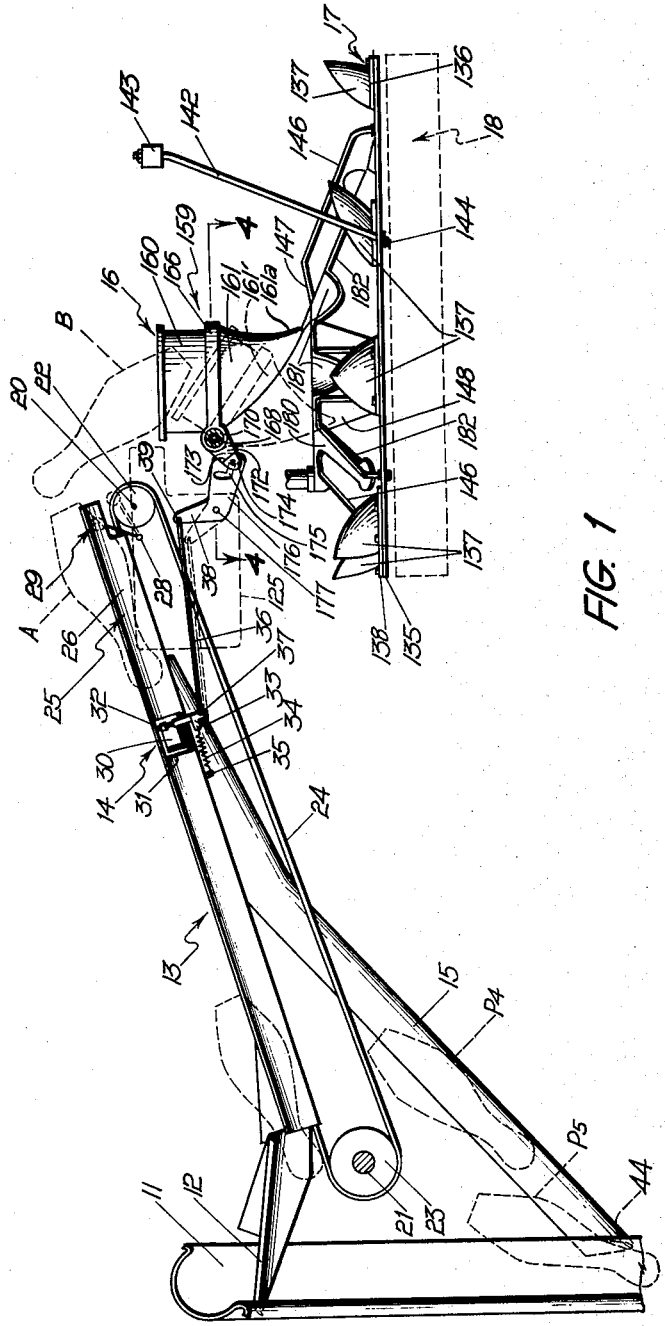
FIGURE 1 is a side elevational view illustrating one embodiment of the invention.

While illustrative embodiments of the invention are shown in the drawings and will be described in detail herein, the invention is susceptible of embodiment in many different forms, and it should be understood that the present disclosure is to be considered as an exemplification of the principles of the invention and is not intended to limit the scope to the embodiments illustrated.

It is contemplated that the pin conveying mechanism of this invention can be utilized in connection with an automatic pinsetter installation which would include means for gathering pins from the pit of the bowling alley and elevating such pins to a position at which they are discharged, e.g., through a turnaround pan, and received by the pin conveying mechanism to be distributed to a pin distributing mechanism for depositing the pins in a pin setting deck which is capable of lowering and setting the pins on the alley when necessary.

Referring now to the drawings in more detail, pins gathered in a bowling alley and conducted to pin elevator wheel 11 are elevated by the wheel to a pin delivery station and deposited in pin turnaround pan 12 in the normal manner. Pin wiper 19 maintains the pins in the wheel near the upper reach of the wheel. Pin turnaround pan 12 functions to deposit the pins base first on cross conveyor 13 which in turn delivers the pins singly to a pin distributor generally designated 16. The distributor delivers the pins to a movable deck structure therebeneath as illustrated in broken lines at 18. The movable deck structure 18 forms a part of the automatic pinsetter installation and moves from an elevated position as illustrated to a lowered position for dropping pins on the alley in the conventional triangular arrangement. The deck structure 18 is also operative for lifting standing pins after a ball has been bowled during a period when falling pins are removed from the alley and then, for replacing such standing pins preparatory to the rolling of a second ball. The automatic pinsetter equipment referred to, including the movable deck structure 18 and suitable means for gathering pins from the pit and elevating the same to cross conveyor 13 is now well-known in the art and, as it forms no part of the present invention, need not be described in further detail herein.

Figure 2:
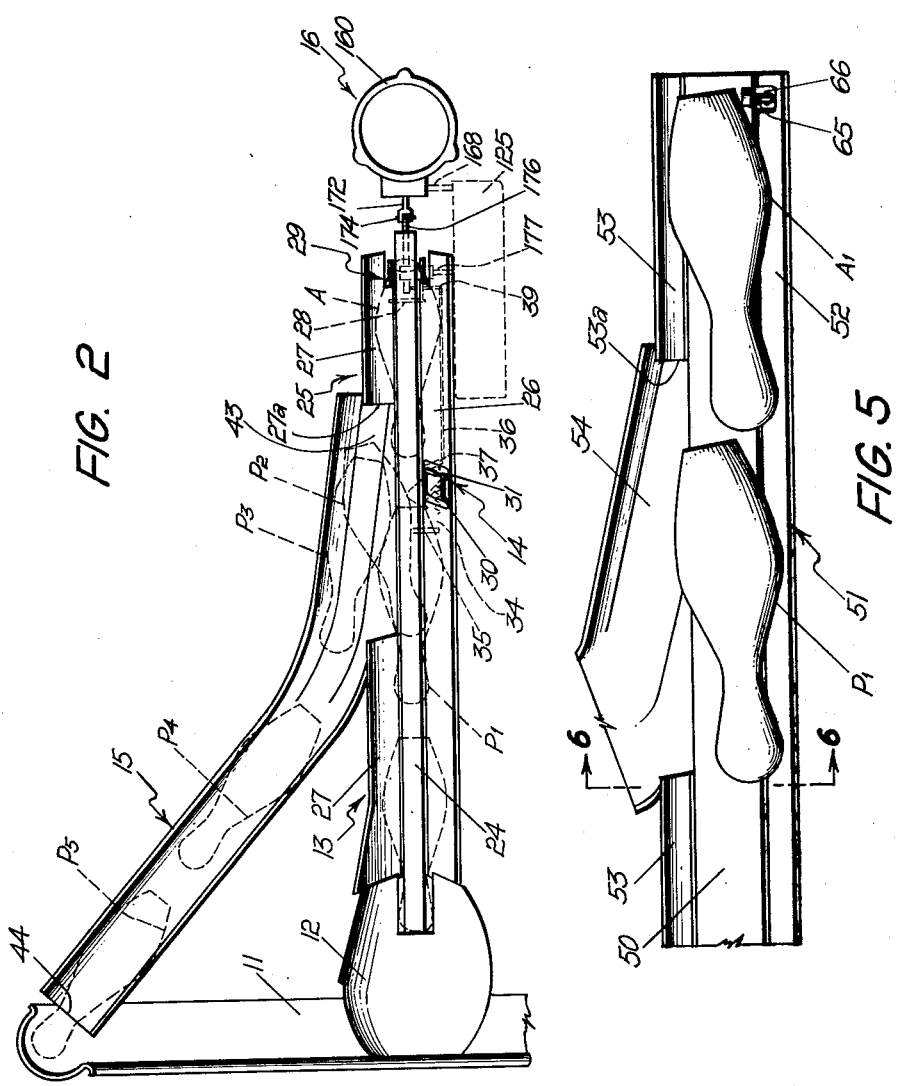
FIGURE 2 is a top view and partial section of the pin supply and conveying system of the embodiment of FIGURE 1.
Figure 3:
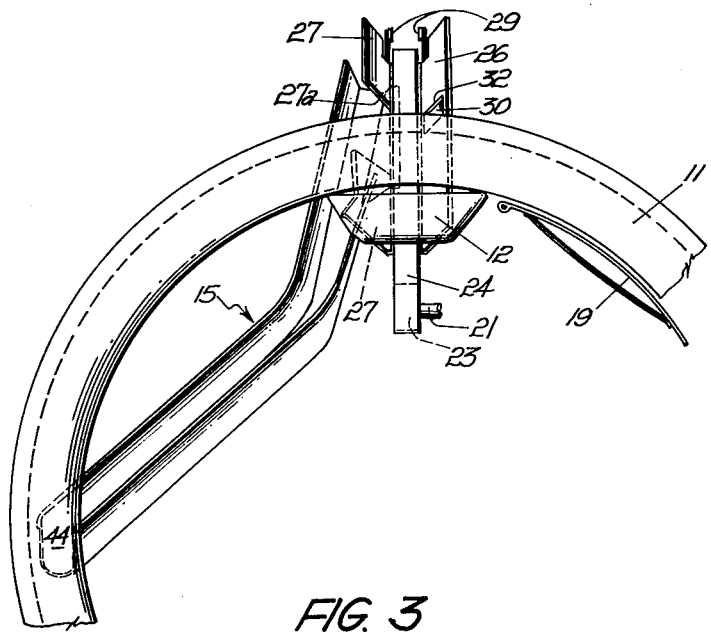
FIGURE 3 is a view of the embodiment of FIGURE 1 from behind the pin elevating wheel.

The cross conveyor 13 as illustrated in FIGURES 1, 2 and 3 includes a pair of shafts 20 and 21, supporting belt pulleys 22 and 23 respectively which in turn support belt 24. Pulley shaft 20 may be suitably supported in and driven from a gear box, illustrated diagrammatically at 125, including suitable transmission drive means (not shown) for driving the shaft to advance the upper reach of belt 24 toward the right in FIGURE 1. The gear box 125 may in turn be supported by a stationary frame structure (not shown) of the type including a cross-rail having a mid portion for supporting the gear box and opposite ends suitably fixed at opposite sides of the alley as illustrated, for example, by William F. Huck and Alexander J. Albrecht, in U.S. Patent 2,967,708.

Conveyor belt 24 forms the bottom of a cross conveyor trough 25 having opposing sides 26 and 27 each canted upwardly and outwardly from the conveyor belt 24. Adjacent the end of furthest travel of the upper reach of belt 24 between trough sides 26 and 27, a pin gate 29 is mounted on shaft 28 for operation from gear box 125. Gear box 125 includes pivotally mounted shaft 28 which carries pin gate or switch member 29 positioned near the end of the conveyor for controlling the passage of pins to the pin distributor 116. The gate member 29 is normally disposed in an upper position illustrated normally in FIGURE 1 where it blocks the passage of a pin from the cross conveyor to the distributor, but is movable under control of means (not illustrated) in the gear box 125 to a depressed position illustrated by dots to permit the passage of a pin to the distributor 16. Movement of the member 29 may be controlled by a means such as that described and illustrated by Alexander J. Albrecht and James B. Wyatt in U.S. Patent 3,014,721, patented December 26, 1961, for example, to time and space the delivery of pins from the conveyor to the distributor one at a time.

Trough side 27 includes opening 27a, sufficient to permit passage of a bowling pin laterally therethrough. On trough side 26, opposing opening 27a, pin deflector assembly 14 is mounted. Deflector 14 includes a deflector plate member 30 which is secured to post 32 and hinged to trough side 26 at a lip of a small opening 31 therein. Opening 31 is of sufficent size to permit passage of plate member 30 therethrough by pivoting on the hinge formed by post 32 as the hinge pin. Attached to the bottom of post 32 and plate member 30 is arm 33 which is normally urged to the left by tension coil spring 34 extending from arm 33 to pin 35 which is secured to the bottom edge of through side 26. Connecting rod 36 is pivotally joined at 37 to arm 33 and extends to terminate at its other end at a pivotal connection 39 with deflector lever 38 which is secured to lever 176 and actuated by gear box 125 via shaft 177 as well as be described in more detail hereinbelow.

By-pass trough 15 is provided to join opening 27a with the downward moving side of pin elevator wheel 11 for return of pins deflected through opening 27a to the pin elevator at 44.

Figure 4:
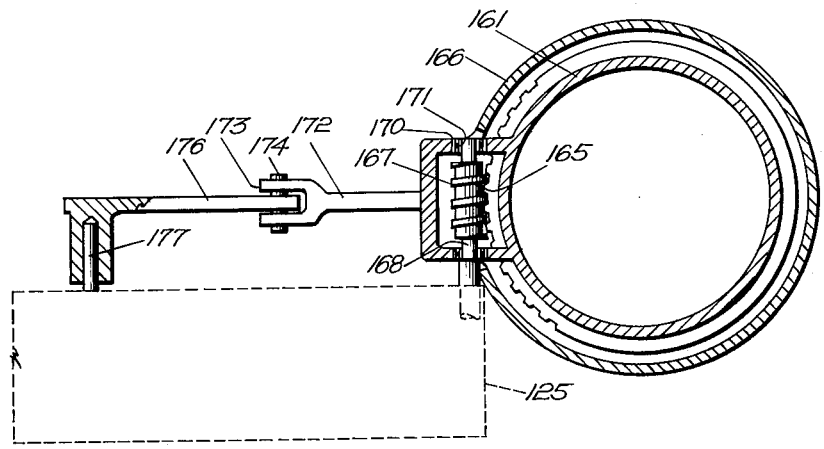
FIGURE 4 is a fragmentary sectional view taken at about line 4—4 of FIGURE 1.

Referring now especially to FIGURES 1 and 4, the stationary deck structure 17 comprises a triangular plate 135 having nine triangularly arranged pin openings therethrough and a tenth opening centrally located within the triangle. These openings are of a size to permit passage of a pin therethrough, and are arranged in a pattern corresponding to the arrangement of pins when set properly on an alley for bowling, and accordingly may be referred to herein as numbered #1 to #10 as the pin positions on the alley are numbered. Adjacent each of the outer pin openings 136, that is, adjacent each of the openings except that corresponding to the #5 pin position, there is provided an upstanding guide or abutment member as at 137 positioned outwardly of the associated opening from the center of the plate. The members 137 act as abutments to limit outward movement of pins while in inclined positions as delivered by the distributor 16, and then as the pins are tipped to upright positions, the members 137 act to guide the bases of the pins into the adjacent openings 136 so that the pins may drop through the plate to the movable deck structure 18. The members 137 may be suitably secured to the deck plate 135 as by means of outwardly turned flange portions 138 bolted or screwed to the plate 135.

Deck plate 135 is stationarily mounted as by means of hanger rods including one (not shown) rigidly suspended from the gear box 125 and fixedly attached at the lower end to the plate 135. Additional hanger rods as at 142 are suspended from a cross rail 143 and have their lower ends fixedly secured to the plate 135 as at 144. The cross rail 143 forms a part of the stationary frame structure adjacent the alley pit and may have opposite ends (not shown) rigidly supported at opposite sides of the alley in a manner similar to the cross rail previously referred to.

In order to guide pins toward each of the outer pin openings 136, that is toward each of the openings except that corresponding to the #5 position, and also for supporting the pins in inclined positions before they are dropped through the pin openings 136 a plurality of guides are provided as at 146. Each of the guides 146 comprises a pair of parallel guide rods 147, and the guides 146 emanate or radiate from positions centrally of the plate 135 which are equally spaced angularly about the center of the plate so as to receive pins from the distributor 16 when the distributor is indexed through equal angular steps. Outer ends of rods 147 are attached to plate 135. The rods 147 extend inwardly to positions adjacent the central pin opening 136 corresponding to the #5 pin, where the rods are turned downwardly and suitably secured to a central annular support member which is somewhat conically inclined and which has its lower portion flanged and secured to the plate 135. Preferably, the inner ends of rods 147 are secured to the support 148 by bolting between support 148 and an inner annular ring (not shown).

The distributor 16 comprises a substantially tubular funnel or chute 159 which includes an upper portion 160 and a lower portion 161. The two portions provide a tube which is open at the upper end and which terminates at the lower end in a laterally and downwardly directed outlet so that the distributor is adapted to receive pins one at a time and to pass these pins lengthwise base first to positions outwardly of the distributor. The heavy base and the belly of the pin falls into the chute and passes through the chute and down the guide rods 147 to a position where the base of the pin overlies the pin opening 136 with the base of the pin engaging the abutment or guide member 137. The lower end of the lower portion 161, including a tongue 161a, directs the pin onto the guide rods 147.

The lower portion 161 of the chute is provided at its upper end with an encircling worm gear 165 which is fixed to the lower portion of the chute and which is rotatably indexably supported on the lower end of the upper portion 160 as at 166 so that the lower portion 161 of the chute is indexable about an upright axis to deliver pins successively to a plurality of stations equally angularly spaced about the upright axis and corresponding respectively to the nine outer pin openings in the plate 135. The worm gear 165 is in mesh with a driving worm 167 on a shaft 168 rotatably mounted in the gear box 125. It will be understood that indexing movement of the lower portion 161 of the chute through nine equal angular increments or steps will provide for delivery of pins to each of the outer pin openings in the plate 135, that is, except to the central opening corresponding to the #5 pin position.

In order to provide for delivery of a pin to the central opening corresponding to the #5 position, the upper chute portion 160, and therefore the lower portion 161, is pivotally mounted for movement about a horizontal axis such as the axis of the worm 167. To this end, the upper portion 160 of the chute is provided at the left with a yoke-like part 170 having bearings as at 171 on the worm shaft 168 thereby pivotally mounting the upper portion 160. In order to pivot the chute, the yoke-like portion 170 is provided with an extension in the form of an arm 172 having a bifurcated lower end portion 173 with a pin 174 therethrough slidably and pivotally mounted in a slot 175 in a pivoted lever 176 fixed on a shaft 177 projecting from the gear box 125. While arm 172 is pivoted only partially, pivoting of lever 38 actuates the deflection system and pin 174 thereafter rides in override slot 175 of arm 172. At this time the pin gate 29 is locked in blocking position by means of gear box 125. It will be understood that on pivotal movement of the lever 176 and deflector lever 38 secured thereto in a counterclockwise direction as viewed in FIGURE 1 to the position illustrated in broken lines, the arm 172 will be pivoted in a clockwise direction and will cause movement of the entire chute in a clockwise direction downwardly to a position illustrated in broken lines at 161' where the tongue 161a substantially engages the inner ring within support 148 on the deck plate so that a pin may be dropped through the central opening corresponding to the #5 pin position. Also, deflection lever 38 will move deflector member 30 into the path of pins proceeding up cross conveyor 13 and deflect them through opening 27a into trough 15 at 43.

In operation of the device with reference to FIGURES 1 through 4 as an integral part of a pinsetter mechanism, pins knocked into an alley pit by a bowler are collected in any conventional manner, e.g., by a constantly oscillating pit conveyor disposed beneath the pinsetter and sloping toward the rear of the pinsetter. At the rear of the pit and the rear of the pinsetter is the large vertically mounted steel wheel or pin elevator 11 which is constantly turning. This wheel is illustrated in part in FIGURES 1, 2 and 3. The slope of the pit conveyor and the oscillation causes the pins in the pit to gravitate toward the rear of the pit. These pins includes the pins knocked into the pit by the bowler as well as those swept from the alley by the rake mechanism as conventionally employed. The pins are directed by the pit conveyor into the bottom of the pin elevator wheel where they are picked up in conventional pin pockets (not shown) within the wheel and carried to the top of the wheel. The pins being elevated in the pin elevator are in random orientation, i.e. some head first and some base first. At the top of elevator 11, the pins are released into pin turnaround pan 12 where the pins are oriented and deposited base first on belt 24 of cross conveyor 13. The pins are then each conveyed up cross conveyor 13 and fed from the other end thereof into chute 159.

When the pin turret of the pinsetter is full and there is no more need for feeding pins into chute 159, pin gate 29, operated from gear box 125, by way of shaft 28, is triggered to raise and remain in the position as shown in FIGURE 1. The next pin travelling up cross conveyor 13 is stopped in a position shown at A by pin gate 29. Pin deflector 14 is triggered as described above by the filling of the last or #5 pin position of the turret, and plate member 30 is swung into trough 25 a distance sufficient to deflect succeeding pins, e.g. as shown at position P–1 approaching pin deflector 14, into by-pass trough 15 at 43 as shown by pin positions P–2 and P–3. Deflected pins slide down by-pass trough 15, e.g. as shown at P–4, and enter the downward moving side of pin elevator 11 at 44 as shown by pin position P–5. Thus, the pins keep recycling through pin elevator 11, cross conveyor 13 and by-pass trough 15, until there is a further need for pins by the pin turret, at which time pin gate 29 is caused to open or drop to a position as shown by dotted lines in FIGURE 1 and the pin from position A proceeds to position B and is dropped into chute 159. At about the same time the pin gate is opened, plate member 30 is withdrawn by the pin deflector mechanism and pins travelling up cross conveyor 13 proceed to positions A and B and into chute 159 in succession until no more pins are needed by the pin turret.

Chute portion 161 is indexed successively to the nine outer pin positions where pins are delivered at each position and left lying inclined with the bases abutting the stop or guide members 137 and with the pins partially supported by the guide rods 147. To assist in guiding the pins from the distributor chute to the guide rods 147 and also to assist in holding the pins in inclined positions a central guide means surrounds the central opening corresponding to the #5 pin position, and this guide means takes the form of a somewhat annular guide member 180 normally positioned slightly above the level of support 148 and shaped as indicated by the shading at 181 to provide a plurality of equally angularly spaced pin stations in the form of shallow channels to which the pins are first delivered from the distributor and from which the pins pass to the guide rods 147. Because the #1, the #10 and the #7 pin positions are spaced considerably further from the pin distributor than the remaining outer pin positions (#3, #6, #9, #8, #4 and #2), the guide member 180 includes elongate tongues as at 182 which project a substantial distance toward the pin positions #1, #10 and #7, and the tongues serve to increase the reach of the guide member 180 toward the remote positions.

In order to tip the pins lying adjacent each of the outer openings from the inclined positions to upright positions so that pins may drop through the openings 136 in the plate 135, the guide member 180 is mounted movably to be raised from the position illustrated in FIGURE 1 to an elevated position. This may be attained by means described by Albrecht et al. in U.S. Patent 3,014,721.

If desired, storage of all ten pins in the stationary deck structure may be provided for by providing for a storage position of the pivotable chute 159. More particularly, if the chute 159 is pivoted in a clockwise direction from the full line position in FIG. 1 only partly to the broken line position 161' and is then stopped, the center pin will not drop through the center opening but will be held abutting a stop member on the annular guide 180, while the annular guide will have been elevated slightly but not sufficiently to drop the pins through the outer openings. As will be recalled, the deflector mechanism is activated during the first portion of pivotal travel of the chute and arm 172, override slot 175 accommodating the remainder of the pivotal action of arm 172. Slot 175 permits full pivotal action of arm 38 and full actuation of the deflector mechanism is during movement of chute 159 to the storage position. Thus, during the storage of pins in the deck structure, the deflector member has been moved into the path of subsequent pins proceeding up cross conveyor 13 for by-passing such pins. Also, gear box 125 locks the pin gate 29 in its pin blocking position.

Figure 6:
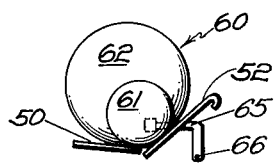
FIGURE 6 is a cross section and view along lines 6—6 of FIGURE 5.

Turning now to FIGURES 5 and 6, there is illustrated an embodiment of a mechanism which functions to automatically deflect succeeding pins from a cross conveyor trough upon stoppage of progress of a preceding pin by a pin gate. This mechanism is usable in combination with associated equipment which has been discussed with reference to FIGURES 1 through 4 and for purposes of discussion of the embodiment of FIGURES 5 and 6, the pin elevating, delivering, conveying, distributing and setting mechanisms described above are to be considered common to this embodiment unless otherwise indicated. Accordingly, pins are deposited by a pin elevator through a pin turnaround pan butt or base first on conveyor belt 50 which defines the bottom of trough 51 and is positioned between canted trough sides 52 and 53. Side 53 includes opening 53a into by-pass trough 54, the by-pass trough extending to the downward moving side of a pin elevator, e.g. to position 44 in pin elevator 11 as illustrated in FIGURES 1, 2 and 3.

Belt 50 is angled to slope sufficiently toward side 52, best seen with reference to FIGURE 6, to cause the pins carried up the cross conveyor to rest at a slight angle in trough 51 in their progression through the trough. Belt 50 is disposed around pulleys 22 and 23 of the cross conveyor mechanism of FIGURES 1 thru 3. To attain the slight angle of pins the entire upper reach of the conveyor belt 50 has been laterally sloped by sloping the entire conveyor belt assembly including shafts 20 and 21 and pulleys 22 and 23 toward one side of the trough in contrast to the embodiment of FIGURES 1, 2 and 3 wherein the belt, pulleys and shafts were maintained relatively level. The lie of a pin in trough 51 is illustrated in FIGURE 6 where a pin 60 is shown having a body and shoulder portion 62 and a head portion 61 with the head resting against trough side 52.

In normal operation for feeding pins to a pin turret, the pins proceed up trough 51 with pin gate 65 retracted and the pins proceed off the end of the cross conveyor and into pin directing or distributing chute for filling a turret. Upon a signal through gear box 125 that the turret is filled, pin gate 65 is swung by shaft 66, which is connected into gear box 125, inwardly to stop a pin at the approximate position A' at a slight angle in trough 51 is illustrated in FIGURE 5. Succeeding pins travelling up cross conveyor trough 51 proceed to position P–1' and slightly beyond this position where they engage the pin at position A'. The angular disposition of the pins, it will be readily seen, causes the succeeding pin to be deflected through opening 53a and into chute 54 and thence to the pin elevator. The pin stopped by the pin gate at position A' acts as a wedge to direct the succeeding pins. As in the case of the embodiment of FIGURES 1, 2 and 3, successive pins are being constantly diverted through the opening in the trough side, i.e. 53a, and returned to the pin elevator.

Advantageously, the arrangements illustrated create and maintain a cycle of pins through the pin elevator, pin turnaround pan, cross conveyor and by-pass trough, back to the pin elevator. Thus, a ready cycling supply of pins is maintained so that when the pin gate is withdrawn and the by-pass is rendered ineffective responsive to needs of the pin turret, the pins proceed from the end of the cross conveyor through the chute and into the turret until the needs of the turret are satisfied.

In operation of either embodiment illustrated, gear box 125 provides for timed operation of gate members 29 or 65 and indexing of the lower chute portion 161 so that a pin passing from the conveyor 13 drops through the chute 159 and, immediately following, the lower portion of the chute is indexed to the next position. After the ninth pin has been dropped, the chute is indexed again to the #1 position, assuming it began by dropping the #1 pin first. At this time, the chute 159 is also pivoted to the broken line position illustrated at 161' to drop the tenth pin through the central opening. In the embodiment of FIGURES 1 through 4, movement of chute 159 to the broken line position actuates the deflector arrangement to recycle pins travelling up the cross conveyor. In the embodiment of FIGURES 5 and 6, the raising of the pin gate at this time holds the next pin on the conveyor whereby succeeding pins are moved out of the conveyor. Simultaneously, with the dropping of the tenth pin through the center openings, the annular guide 180 is elevated to tip the outer pins to upright position so that these also drop to the moving deck structure 18 to be set in triangular configuration upon the bowling alley.

Although the drive mechanism for the various movable parts of the illustrated embodiments have not been set forth in the drawings and have not been discussed in detail herein, suitable drive arrangements including belts and/or gears are known in the art. For example, the drive mechanism described by Albrecht et al. in U.S. 3,014,721 is usable in accordance herewith.

I claim:

1. A pin conveying mechanism for conveying pins from a pin source within a pin setting mechanism to a pin distributing mechanism, which pin conveying mechanism comprises a generally horizontally disposed cross conveyor having a first end for receiving pins from said pin source and a second end for delivering pins from said cross conveyor and including conveyor means for carrying pins from said first end to said second end, retractable gate means adjacent said second end for preventing discharge of pins from said second end and bypass means between said two ends of said cross conveyor for diverting pins from said cross conveyor to said pin source.

2. The cross conveyor mechanism of claim 1 wherein said by-pass means comprises deflector means for deflecting pins from said cross conveyor and conduit means for receiving deflected pins and conveying them to the pin source.

3. The pin conveying mechanism of claim 1 wherein said by-pass means comprises means for directing pins to an angular position on said cross conveyor relative to the direction of cross conveyor travel, means constraining lateral movement of a pin stopped in its travel by said pin gate on said cross conveyor and means permitting angular lateral movement of subsequent pins from said cross conveyor under urging of said subsequent pins into contact with said stopped pin in angular disposition, said angular disposition being sufficient to deflect said subsequent pins from said cross conveyor.

4. A bowling pin conveying mechanism adapted to convey pins from a pin source to a pin distributing mechanism, which pin conveying mechanism comprises a generally horizontally disposed cross conveyor having first and second ends and including a trough having a first side and a second side, a conveyor belt defining the bottom limit of said trough, an opening in the first side of said trough, a by-pass conduit extending from said opening to the pin source, said cross conveyor being adapted to receive bowling pins from said pin source at the first end of said cross conveyor and being capable of continuously moving said bowling pins toward the second end of said cross conveyor, said opening being between said first and second ends of said cross conveyor, retractable gate means at the second end of said cross conveyor adapted to stop passage of pins from said second end of said cross conveyor and deflector means adapted to deflect pins from said cross conveyor through said opening and into said by-pass conduit for return of deflected pins to the pin source.

5. The bowling pin conveying mechanism of claim 4 wherein said deflector means comprises a pivotally mounted deflector member adapted to pivot into said trough from the second side of said trough opposing said opening to deflect bowling pins on the upper reach of said conveyor belt through said opening into said pin return conduit means.

6. The bowling pin conveying mechanism of claim 4 wherein said deflector means comprises means supporting said conveyor belt on a lateral slope toward said second side and wherein said opening is at a sufficient distance from said second end of said cross conveyor to permit retention of a bowling pin by said pin gate means, the lateral slope of said belt being sufficient to effect angular disposition of bowling pins within said trough whereby subsequent bowling pins urged against a bowling pin retained by the gate means are deflected through said opening.

7. A cross conveyor having first and second ends for conveying bowling pins deposited thereon adjacent the first end base first from a pin source to a pin distributing mechanism, said cross conveyor comprising a trough including two opposing outwardly and upwardly canted sides spaced from each other, a conveyor belt having its upper reach disposed between said sides adjacent the bottom of said sides forming the lower limit of said trough, pin gate means at the second end of said cross conveyor adapted to permit intermittent and sequential discharging of pins from said second end in response to the needs of the pin distributor mechanism, an opening in the first of said canted sides at a sufficient distance from the second end of said cross conveyor to permit the retention of a bowling pin between said sides and on said belt by said pin gate means, said opening being sufficient to receive a bowling pin passing laterally therethrough, a retractable pin deflector plate pivotally attached to the second side of said trough opposing said opening and being spring urged to project into said trough sufficient to deflect pins travelling through said trough out of said trough through said opening, by-pass trough means adapted to convey deflected pins downward by gravity from said opening to said pin source, and link works means adapted to maintain said deflector plate in retracted position until the pin needs of said pin distributing mechanism are satisfied and adapted to permit urging of said deflector plate to its projected position upon satisfaction of the pin needs of said pin distributing mechanism.

8. A cross conveyor having first and second ends comprising a trough including opposing outwardly and upwardly canted first and second sides, a conveyor belt having its upper reach disposed between the lower portions of said sides, said conveyor belt being adapted to receive bowling pins disposed thereon butt first from a pin source at the first end of said cross conveyor, pin gate means at the second end of said cross conveyor adapted to alternately engage and disengage pins carried to said second end to permit said pins to be discharged from said second end in timed sequence in accordance with the demands of a pin distributing mechanism, an opening in the first side of said trough sufficient to permit the lateral passage of a bowling pin therethrough and disposed at a sufficient distance from the second end of said cross conveyor to permit retention of a bowling pin by said pin gate means at said second end without lateral movement thereof through said opening, said conveyor belt disposed on a slope laterally toward said second side of said trough at an angle effecting angular disposition of bowling pins conveyed within said trough so that the heads of said bowling pins rest against said second side, the lateral slope of said belt effecting sufficient angular disposition to pins on said belt to cause lateral movement of subsequent pins upon striking the head on a bowling pin held by said gate means, said opening being positioned to permit passage of said subsequent pins therethrough by said lateral movement.

9. A pin conveying and distributing mechanism for conveying pins from a pin source and delivering conveyed pins to a plurality of pin receiving positions, which mechanism comprises a cross conveyor adapted to receive and convey pins from a pin source to a pin discharge station, a pin distributor for receiving pins from said discharge station and directing pins to said plurality of pin receiving positions, by-pass means capable of diverting pins from said cross conveyor to said pin source, and link works between said distributor and said by-pass means, said link works being adapted to control said by-pass means to enable said by-pass means upon satisfaction of the pin needs of said distributor and to disenable said by-pass means responsive to pin needs of said distributor.

10. A pin conveying and distributing mechanism for conveying pins from a pin source and delivering conveyed pins to a plurality of angularly spaced pin receptacles in triangular configuration, which mechanism comprises a generally horizontally disposed cross conveyor having first and second ends and adapted to receive and convey pins from said pin source at the first end of said cross conveyor to a pin discharge station at the second end of said cross conveyor, a pin distributor adapted to receive pins one at a time from said discharge station and direct said pins seriatim to said plurality of pin receiving positions, normally closed retractable gate means at said second end of said cross conveyor capable of preventing the travel of pins from said second end of said cross conveyor and adapted to permit flow of pins to said distributor responsive to the needs of said distributor, by-pass means between said first and second ends of said cross conveyor capable of diverting pins from said cross conveyor to said pin source and link works for enabling said by-pass means responsive to the directing of the last pin to said plurality of positions by said distributor.

11. The mechanism of claim 10 wherein said by-pass means is enabled by closing of said pin gate.

12. In an automatic pinsetter wherein pins are elevated from a bowling alley pit, a generally vertical continuously rotatable wheel for elevating pins from a pit, turnaround means for receiving pins from said wheel to discharge pins base end first, a cross conveyor for receiving pins base first from said turnaround means and by-pass means for directing pins from said cross conveyor into said wheel.

13. The device of claim 12 wherein said by-pass means includes means for directing pins from said cross conveyor to the downward moving side of said wheel elevator.

14. A pin conveying mechanism for conveying pins from a pin source to a pin distributor mechanism, which pin conveying mechanism comprises conveying means for receiving and conveying pins from said pin source, operable means for holding a pin on said conveying means in a position for deflecting subsequent pins out of said conveying means, and means for receiving said subsequent pins and for returning said subsequent pins to said pin source.

15. A pin conveying mechanism for conveying pins from a pin source to a pin distributor mechanism, which pin conveying mechanism comprises a conveyor belt inclined downwardly to one side, means generally upstanding at said one side for retaining pins on said belt and means for holding a pin against travel with said belt in a position blocking and directing subsequent pins off of said belt from the other side thereof.

16. A pin conveying and distributing mechanism comprising a generally horizontally disposed cross conveyor including side walls and adapted to receive pins from a pin source and convey pins to a pin discharge station, a pin distributor at said discharge station for receiving pins one at a time from said conveyor, said distributor having a downwardly and laterally directed chute for passing pins lengthwise one at a time, means mounting the distributor for indexing about an upright axis to deliver pins respectively to a plurality of positions spaced around said axis, a pin receiving deck disposed beneath the distributor and having a plurality of pin receiving stations respectively at said positions for receiving pins from said distributor, open gateless by-pass means including an opening in one of said side walls for directing pins from said cross conveyor to said pin source, trough means extending from said opening downward to said pin source, and means actuable for directing pins from said cross conveyor through said opening whereby the directed pins are returned through the trough means to said pin source.

17. A pin conveying mechanism for conveying pins from a pin source within a pinsetting mechanism to a pin distributing mechanism, which pin conveying mechanism comprises a generally horizontally disposed cross conveyor having a first end for receiving pins from said pin source and a second end for delivering pins from said cross conveyor and including conveyor means for carrying pins from said first end to said second end, blocking means adjacent said second end for preventing discharge of pins from said second end, and by-pass means between said two ends of said cross conveyor for diverting pins from said cross conveyor to said pin source.

18. A pin conveying mechanism for conveying pins from a pin source to a pin distributor mechanism, said pin conveying mechanism comprising conveying means for receiving and conveying pins from a pin source, pin retaining means adjacent said conveying means, pin exit means in said retaining means, and means for holding a pin on said conveying means in a position for deflecting subsequent pins through said exit means.

References Cited by the Examiner

UNITED STATES PATENTS

| | | | |
|---|---|---|---|
| 2,671,549 | 3/1954 | Lubetkin | 198—28 |
| 2,692,139 | 10/1954 | Dumas | 273—43 |
| 2,709,591 | 5/1955 | Parry | 273—43 |
| 2,711,318 | 6/1955 | Schmidt | 273—43 |
| 2,786,679 | 3/1957 | Strauss et al. | 273—43 |
| 2,911,218 | 11/1959 | Scherzinger | 273—43 |
| 2,967,708 | 1/1961 | Huck et al. | 273—43 |
| 3,014,721 | 12/1961 | Albrecht et al. | 273—43 |
| 3,048,398 | 8/1962 | Kalbfleisch | 273—43 |

DELBERT B. LOWE, *Primary Examiner.*